Nov. 21, 1950     F. DELL' ANNO     2,530,601
ARTIFICIAL TEETH
Filed Dec. 26, 1946
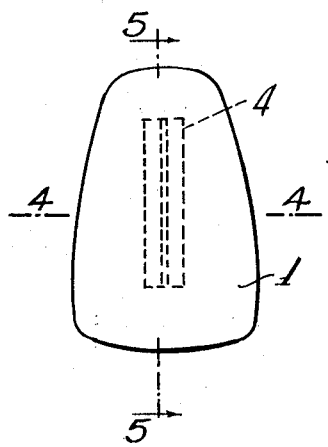
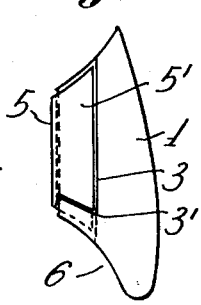
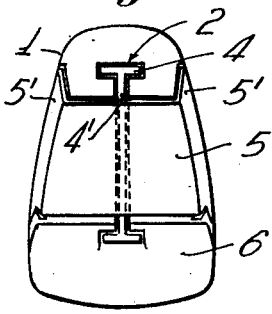
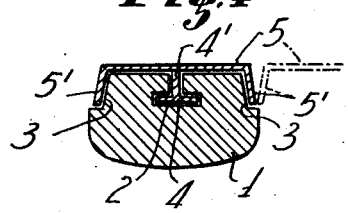
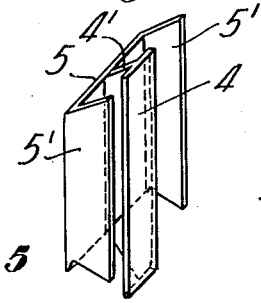
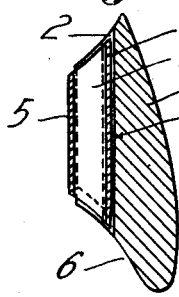
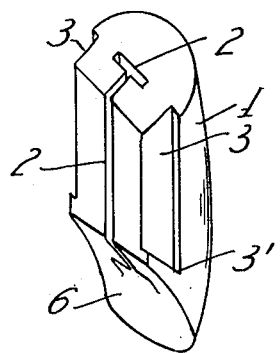
INVENTOR:
FRANCISCO DELL' ANNO Patented Nov. 21, 1950

2,530,601

UNITED STATES PATENT OFFICE 2,530,601

ARTIFICIAL TOOTH

Francisco Dell' Anno, Buenos Aires, Argentina

Application December 26, 1946, Serial No. 718,423
In Argentina November 20, 1946

1 Claim. (Cl. 32—9)

The present invention refers to important improvements in artificial teeth, and has for its object certain useful means for securing a dental unit, such as a tooth, to bridges.

Artificial teeth are already known which are provided with channels or bores to receive therein a small pin by which such teeth are secured to teeth bridge work. There exist also other artificial teeth having one or more pins which facilitate their junction with a bridge or crown.

These known systems of attaching teeth to each other have various drawbacks such as: weakening of the tooth, lack of rigidity at the point where the tooth is to be attached; decrease or complete disappearance of translucency and luster of the artificial tooth owing to the fact that the use of cement causes loss of the transparency, thereby showing to great disadvantage the difference between the artificial and the natural teeth; lack of efficient engaging means capable of holding the walls of the tooth and acting, at the same time, as a link between two or more adjacent units.

The present invention does away with these drawbacks and consists substantially in adapting a T-shaped member or strip at the thickest portion of the tooth and a U-shaped plate rearwardly thereof, which engages also the lateral portions of the tooth which are recessed to this effect, and joins said strip by means of its web.

The T-shaped or angular member is adapted to move effectively and better engage the body of the tooth without very much weakening the latter. As a matter of fact, it requires a channel of like shape to be made thereon, which means that comparatively little material is taken off in forming the channel, by virtue of which, the resistance of the walls of the tooth is not weakened and a suitable thickness is maintained so that the porcelain will not lose its translucency. On the other hand, the aforesaid plate holds or supports these walls whereby the above results or effects are achieved.

In order that the invention may be more fully understood and readily put into practice, an embodiment of the invention is shown by way of example, on the accompanying drawing wherein:

Fig. 1 is a front view of a dental unit or tooth made in accordance with the present invention.

Fig. 2 is a side elevational view of the tooth of Fig. 1.

Fig. 3 is a rear view of the tooth of Fig. 1.

Fig. 4 is a section taken along line 4—4 of Fig. 1.

Fig. 5 is a vertical section taken along line 5—5 of Fig. 1.

Fig. 6 is a perspective view of the metal plate and its web employed in the invention.

Fig. 7 is a perspective rear view of the artificial tooth provided with recesses and channel made in accordance with the invention.

In the drawing similar parts are indicated by the same reference numerals.

The structure, according to an embodiment of the invention, consists of the incisor 1, whose rear and central portions are provided with the T-shaped channel 2 (Figs. 4 and 7). Its two lateral and rear portions have flat recesses 3 commencing at the edge which comes to lie adjacent the gum and ending in an inwardly directed or reentering angle at 3', as will be noted from Figs. 2 and 7.

Tooth 1 is thus prepared to engage a metal piece or portion by which said tooth may be suitably anchored, as will be seen later on. This metal portion is composed of the T-shaped strip 4 which fits channel 2 of tooth 1, since said channel has the same shape as strip 4. Furthermore, web 4' of strip 4 is welded at its top to front sheet or plate 5 along the center of the inner face thereof. This plate 5 has at both sides the lateral wing plates or portions 5' bent at a dihedral slightly obtuse angle, said wing plates engaging the recesses 3 of tooth 1 for fixation thereto. The front or outer face of plate 5 conforms to the anatomical shape of the tooth (either convex or flat, as the case may be).

It is needless to say, that both plate 5 and its wings 5' will be made in a molding or forming operation, as known in the art of dental prosthesis. Member or strip 4 may be furnished prefabricated, in considerable length which is then cut to measure as required by tooth 1.

The metallic portion 4—4' and 5—5' is secured to tooth 1 by using an adhesive or cement that is applied to adjacent or contact surfaces, whereupon strip 4 is slidingly mounted from one end to assume its place within channel 2. It should be noted that one does not run any risk of damaging the tooth during this operation, inasmuch as any excess cement which might be applied thereto on introducing strip 4 escapes at the end of channel 2 opposite to that from which the mounting of strip 4 takes place.

The tooth thus being prepared with its plate and strip may be secured to various dental restorations. To secure it to a bridge all that is necessary is to weld the outer and lateral portions of plate 5 of each of the teeth forming the artificial denture to the same, whereby such denture becomes rigid and resistant to wear. To secure the tooth to a "pivot," as in the case of other appliances of stationary teeth, that "pivot" is fixed at the corresponding part in keeping with the rules of the art, when numerous advantages regarding the resistance of the anchorage, the anatomical fitting, etc. will be obtained. To secure it to the next following artificial tooth, all that is required is to provide a weld seam between the contact surfaces of the wings 5' of one tooth and the one in juxtaposition, as is shown in dotted lines of Fig. 4, the welding material being applied between the two adjacent wings 5' when it may be slightly extended towards the outer face of plate 5.

It is pointed out that with this class of dental prosthesis the following results are obtained:

(a) Anatomical conformation of plate 5 and strip 4 to the curvature of the tooth.

(b) The anchorage exerted by plate 5 and its side wings 5' together with their engagement within the acute angle 3' of the recess 3 gives rise to an efficient position and rigidity of the tooth, thereby avoiding its breakage, particularly owing to the fact that the same is prevented from bending outwardly when chewing or biting into food;

(c) Invisibility of the metal of the artificial tooth inasmuch as the plate is hidden at the rear and lateral portions thereof;

(d) Efficient fastening of strip 4 by virtue of its shape which does not inordinately weaken the walls of the tooth;

(e) Ready replacement of tooth 1 if need be, the same strip 4 and plate 5 being used. To this effect, all that is necessary is to disengage tooth 1 from the metal portion 4—5, either by dissolving the cement or by any other suitable means.

The invention is applicable to both incisors and canines as well as premolars and molars.

It can thus be seen that there has been provided according to this invention an artificial tooth structure with anchoring means, said tooth comprising a body having a top, bottom, rear and side faces, said body being provided with a T-shaped channel projecting from said rear face into said body and extending from said top toward said bottom face in longitudinal direction of said tooth, said channel having an opening at the location of intersection of said channel with said rear face, a recess extending from each lateral end of said rear face into each side face of said body and being substantially coextensive with said projecting channel, said recesses terminating in longitudinal direction of said tooth a predetermined distance from said bottom face, said anchoring means comprising respective portions fitting said channel and said recesses and abutting flush against the rear face of said body, whereby said tooth and said anchoring means when applied to said recesses and said rear face conform to the biological shape of said tooth.

It is obvious that certain constructional changes may be introduced without departing from the scope of the present invention clearly ascertained in the appended claim.

Having thus described the invention, what is claimed as new and desired to be secured by Letters Patent, is:

An artificial tooth comprising a body having top, bottom, rear, and two side faces, said top face sloping in downward direction rearwardly, said bottom face sloping in upward direction rearwardly, said body being provided with a substantially T-shaped channel extending from said rear face into said body and substantially vertically from said top to said bottom face, said channel including a substantially vertical, longitudinal slot opening into said rear face and a substantially vertical, transverse slot forming the cross of said T-shaped channel, said transverse slot being disposed remote from said rear face within said body and communicating with said longitudinal slot, a recess extending from each lateral end of said rear face into the respective side faces of said body and being substantially coextensive with said T-shaped channel, the extent of projection of said T-shaped channel and of said recesses into said body from said rear face being less than one-half the thickness of said body determined by the distance between said rear face and the front face of said body.

FRANCISCO DELL' ANNO.

REFERENCES CITED

The following references are of record in the file of this patent:

UNITED STATES PATENTS

| Number | Name | Date |
| --- | --- | --- |
| 1,082,776 | Stewart | Dec. 30, 1913 |
| 1,212,935 | Glenn | Jan. 16, 1917 |
| 1,335,717 | Arkin | Apr. 6, 1920 |
| 1,407,557 | McVicker | Feb. 21, 1922 |
| 1,426,114 | Schwartz | Aug. 15, 1922 |
| 1,473,055 | Steele | Nov. 6, 1923 |
| 1,516,003 | Davis | Nov. 18, 1924 |
| 1,577,753 | Rafkin | Mar. 23, 1926 |
| 1,688,621 | Huber | Oct. 23, 1928 |
| 1,782,251 | Beck | Nov. 18, 1930 |

OTHER REFERENCES

Page 693 of publication "The Dental Cosmos," 1927. (Copy in Div. 55.)